US009684967B2

(12) United States Patent
Abedini et al.

(10) Patent No.: US 9,684,967 B2
(45) Date of Patent: Jun. 20, 2017

(54) IMAGING SEGMENTATION USING MULTI-SCALE MACHINE LEARNING APPROACH

(71) Applicant: International Business Machines Corporation, Armonk, NY (US)

(72) Inventors: Mani Abedini, Melbourne (AU); Rajib Chakravorty, Epping (AU); Rahil Garnavi, Macleod (AU); Munawar Hayat, Carlton (AU)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 14/921,579

(22) Filed: Oct. 23, 2015

(65) Prior Publication Data

US 2017/0116744 A1   Apr. 27, 2017

(51) Int. Cl.
*G06K 9/00* (2006.01)
*G06T 7/00* (2017.01)
*G06K 9/62* (2006.01)
*G06K 9/46* (2006.01)
*G06K 9/52* (2006.01)

(52) U.S. Cl.
CPC .......... *G06T 7/0087* (2013.01); *G06K 9/4604* (2013.01); *G06K 9/52* (2013.01); *G06K 9/6256* (2013.01); *G06K 9/6262* (2013.01); *G06K 9/6267* (2013.01); *G06T 7/0012* (2013.01); *G06T 7/0085* (2013.01); *G06T 2207/20021* (2013.01); *G06T 2207/20112* (2013.01); *G06T 2207/30088* (2013.01)

(58) Field of Classification Search
None
See application file for complete search history.

(56) References Cited

U.S. PATENT DOCUMENTS

| | | | |
|---|---|---|---|
| 6,993,167 B1* | 1/2006 | Skladnev | A61B 5/444 382/128 |
| 8,488,863 B2 | 7/2013 | Boucheron | |
| 2006/0083423 A1* | 4/2006 | Brown | G06K 9/00362 382/159 |
| 2010/0111396 A1 | 5/2010 | Boucheron | |
| 2012/0128237 A1 | 5/2012 | Wang et al. | |

(Continued)

OTHER PUBLICATIONS

A methodological approach to the classification of dermoscopy images, Celebi et al., Computerized medical imaging and graphics 31 (2007) 362-373, Jan. 8, 2007.*

(Continued)

*Primary Examiner* — Vikkram Bali
(74) *Attorney, Agent, or Firm* — Fleit Gibbons Gutman Bongini Bianco PL; Jon A. Gibbons

(57) ABSTRACT

A robust segmentation technique based on multi-layer classification technique to identify the lesion boundary is described. The inventors have discovered a technique based on training several classifiers such that to classify each pixel as lesion versus normal Each classifier is trained on a specific range of image resolutions. Then, for a new test image, the trained classifiers are applied on the image. Then by fusing the prediction results in pixel level a probability map is generated. In the next step, a thresholding method is applied to convert the probability map to a binary mask, which determines a mole border.

20 Claims, 8 Drawing Sheets

(56) References Cited

U.S. PATENT DOCUMENTS

2013/0028487 A1     1/2013   Stager et al.
2015/0065803 A1*   3/2015   Douglas ............. A61B 1/00009
                                                              600/200

OTHER PUBLICATIONS

Computer aided diagnosis of melanoma, by Rahil Garnavi, Thesis for fulfillment of the requirements of the degree, Aug. 2011, University of Melbourne, Australia.*

Automatic segmentation of dermoscopic images by iterative classification, by Zortea et al., May 4, 2011 19 pages, International Journal of Biomedical Imaging.*

Borenstein, E., et al., "Class-Specific,Top-Down Segmentation", 7th European Conference on Computer Vision ECCV, May 28-31, 2002, pp. 1-14.

Debeir, O., et al., "Computer-Assisted Analysis of Epiluminescence Microscopy Images of Pigmented Skin Lesions", Cyometry, Aug. 14, 1999, pp. 1-12, vol. 37, No. 4.

American Cancer Society, "Cancer Facts & Figures", Atlanta: American Cancer Society, 2014, pp. 1-72.

Braun, R.P., et al., "Dermoscopy of Pigmented Skin Lesions", Journal of the Academy of Dermatology, Jan. 2005, pp. 1-13, vol. 52, No. 1.

Geller, A.C., et al.,"Screening, Early Detection, and Trends for Melanoma: Current Status (2000-2006) and Future Directions", Journal of the American Academy of Dermatology, Oct. 2007, pp. 1-19, vol. 57, Issue 4.

Balch, C.M., et al., "Prognostic Factors Analysis of 17,600 Melanoma Patients: Validation of the American Joint Committee on Cancer Melanoma Staging System", Journal of Clinical Oncology, Aug. 15, 2001, pp. 1-13, vol. 19, No. 16.

Mendonca, T., et al., "PH2—A Dermoscopic Image Database for Research and Benchmarking", IEEE Conference Engineering in Medicine Biology Society, Jul. 2013, pp. 1-4.

Ahn, E., et al., "Automated Saliency-based Melanoma Detection in Dermoscopic Images", Research Conversazione, 2014, p. 1, The University of Sydney.

Liu, D., et al., "Sample-Specific Late Fusion for Visual Category Recognition", IEEE Conference on Computer Vision and Pattern Recognition, Jun. 2013, pp. 1-8.

Celebi, M.E., et al., "Lesion Border Detection in Dermoscopy Images", Computerized Medical Imaging and Graphics, Nov. 13, 2008, pp. 1-6.

Yuksel, M.E, et al., "Accurate Segmentation of Dermoscopic Images by Image Thresholding Based on Type-2 Fuzzy Logic", IEEE Transactions on Fuzzy Systems, Aug. 2009, pp. 1-7, vol. 17, No. 4.

Celebi, M.E., et al., "Approximate Lesion Localization in Dermoscopy Images", Skin Research and Technology, Aug. 2009, pp. 1-15, vol. 15, No. 3.

Celebi, M.E., et al., "Robust Border Detection in Dermoscopy Images Using Threshold Fusions", 17th IEEE International Conference on Image Processing, Sep. 2010, pp. 1-4.

Wighton, P., et al., "Generalizing Common Tasks in Automated Skin Lesion Diagnosis", IEEE Transactions on Information Technology in Biomedicine, Jul. 2011, pp. 1-8, vol. 15, No. 4.

Wighton, P., et al., "Conditional Random Fields and Supervised Learning in Automated Skin Lesion Diagnosis", International Journal of Biomedical Imaging, Jul. 2011, pp. 1-10.

* cited by examiner

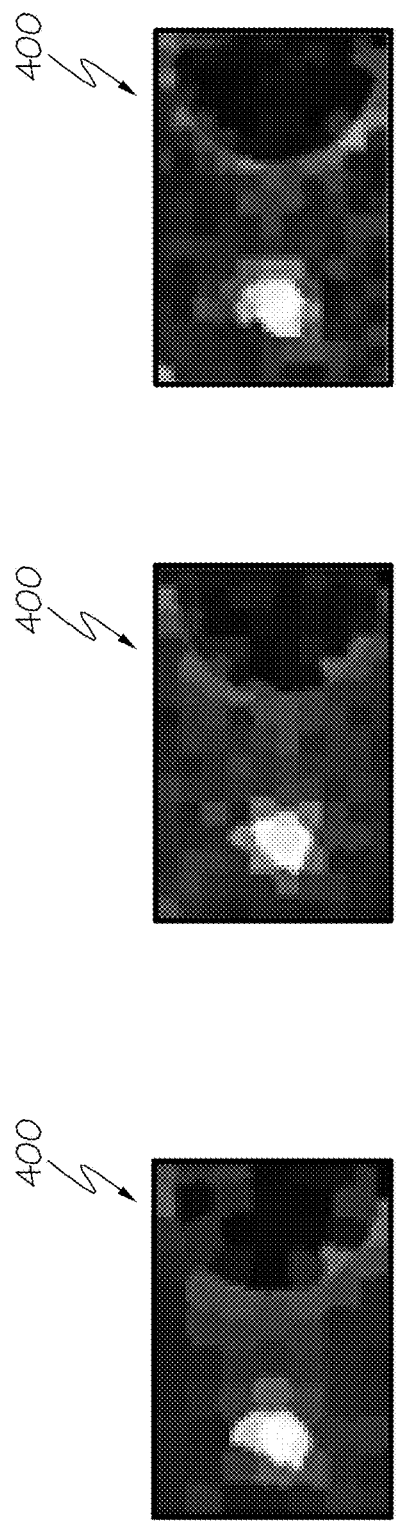
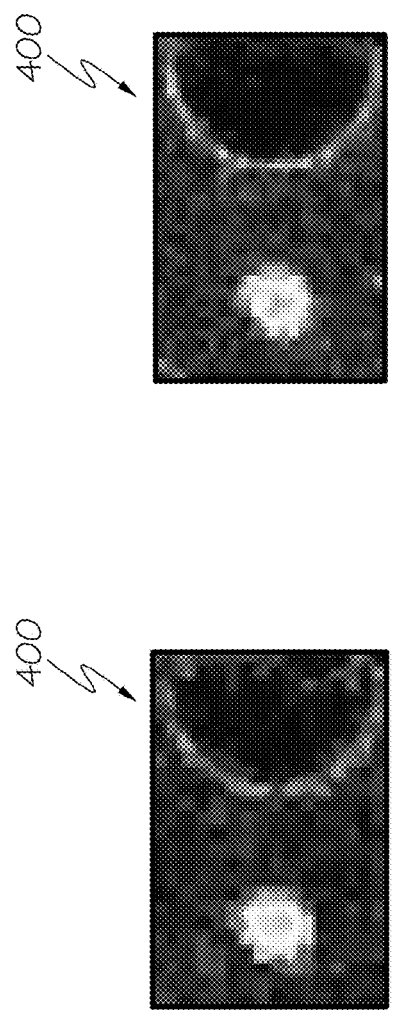
FIG. 4A
FIG. 4B
FIG. 4C
FIG. 4D
FIG. 4E

IMAGING SEGMENTATION USING MULTI-SCALE MACHINE LEARNING APPROACH

BACKGROUND

The present invention generally relates to computer analytics, and more specifically to computer analytics as applied to border detection in an image.

Malignant melanoma is one of the most common and the deadliest type of skin cancer. It has been shown that early detection of melanoma and immediate surgical excision of the lesion can increase the survival rate by five folds. Dermoscopy is an important non-invasive tool for clinical diagnosis of melanoma. However, due to subjectivity of human expert in interpretation of skin lesions, computer-based analysis of dermoscopy images has become more popular in the last decade. Skin lesion border detection is the first and a very crucial step towards automated dermoscopy image analysis.

The problem of border detection is not a trivial task. It is indeed an active research area, and a lot of effort has been made to improve lesion segmentation algorithms, including using iterative thresholding, fuzzy logic based thresholding, fusion of thresholds, saliency based border detection, neural network, and supervised learning methods.

SUMMARY

Disclosed is a novel system, computer program product, and method to use a multi-scale classification based border detection method to identify the lesion boundary and separate the lesion from surrounding skin. There are two categories of border detection techniques in the literature: supervised and unsupervised techniques. The claimed invention uses supervised machine learning. Also, the method uses late fusion method by combining several predicted borders which have been generated from different classifiers.

More specifically, disclosed is robust segmentation technique based on multi-layer classification technique to identify the lesion boundary is described. The inventors have discovered a technique based on training several classifiers such that to classify each pixel as lesion versus normal. Each classifier is trained on a specific range of image resolutions. Then, for a new test image, the trained classifiers are applied on the image. Then by fusing the prediction results in pixel level a probability map is generated. In the next step, a thresholding method is applied to convert the probability map to a binary mask, which determines a mole or lesion border.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 4A-4E are a series of images illustrating different size training sub-sections;

DETAILED DESCRIPTION

Figure 1:
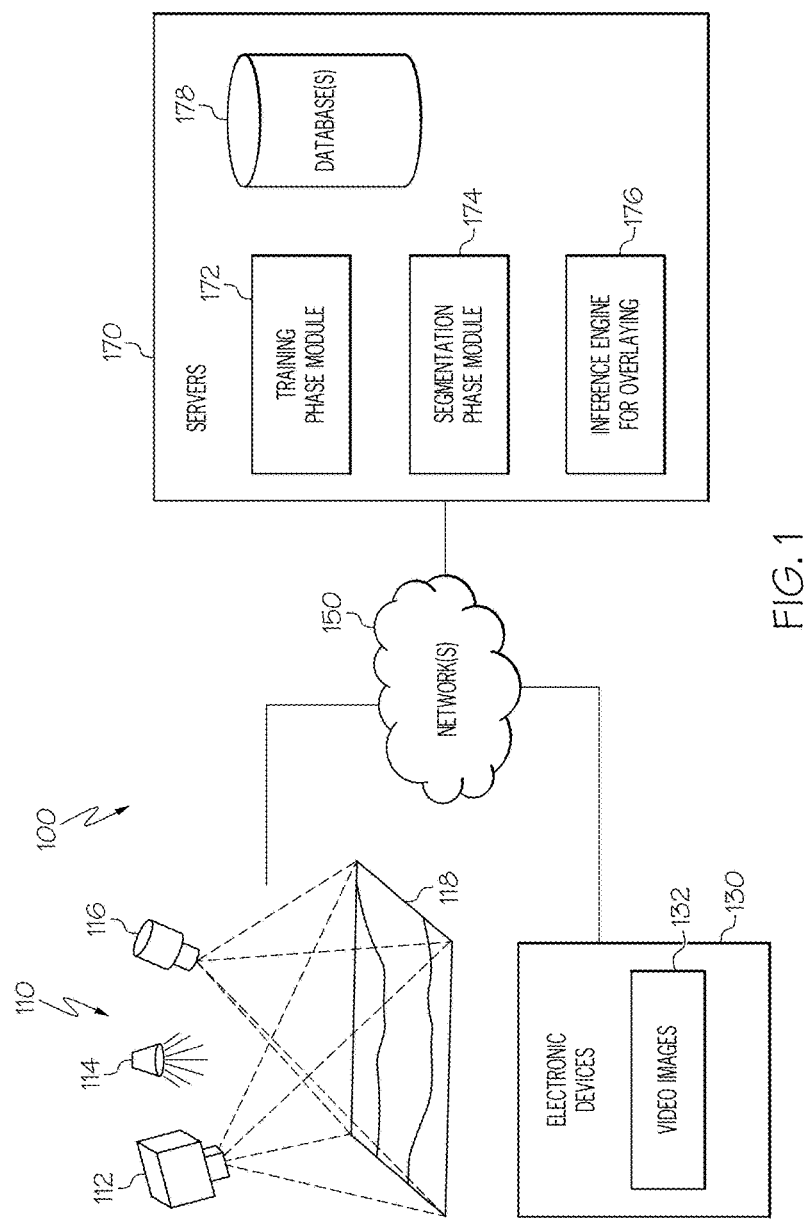
FIG. 1 is a block diagram illustrating one example of an overall system.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

The present invention improves border detection in images, especially borders in medical images such as, but not limited to, dermoscopy images. More specifically, a robust segmentation technique based on multi-layer classification technique to identify the lesion boundary is described. The inventors have discovered a technique based on training several classifiers such that to classify each pixel as lesion or normal. Each classifier is trained on a specific range of image resolutions. Then, for a new test image, the trained classifiers are applied on the image. Then by fusing the prediction results in pixel level a probability map is generated. In the next step, a thresholding method is applied to convert the probability map to a binary mask, which determines a mole or lesion border.

Non-Limiting Definitions

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "inference engine" is used to mean a tool from artificial intelligence and expert systems. The typical expert system consisted of a knowledge base and an inference engine. The knowledge base stored facts about the world. The inference engine applied logical rules to the knowledge base and deduced new knowledge. This process would iterate as each new fact in the knowledge base could trigger additional rules in the inference engine.

A "subject of interest" refers to any subject having a network of subcutaneous blood vessels beneath skin tissue. Terms used herein such as 'person' or 'patient' are not to be viewed as limiting the scope of the appended claims solely to human subjects. Subjects include mammals, birds, reptiles, fish, and even certain insects.

The term "superpixel" is an image patch which is better aligned with intensity edges than a rectangular patch. Superpixel can be extracted with any segmentation algorithm, however, most of them produce highly irregular superpixel, with widely varying sizes and shapes. A more regular space tessellation may be desired.

Operating Environment

FIG. 1 shows one example of a system 100 for border detection in an image. Apparatus 110 shows an example camera system comprising an illumination source 114, cameras 112,116. In one embodiment only one camera is used. The cameras may be 3-channel RGB camera, a single NIR camera, multi-spectral camera, to capture video of a subject of interest's skin on their arm 114. In another example the RGB camera and the IR camera have been integrated into a single composite image capture device. Conversely, individual video cameras are used for each of the desired visible channels, i.e., R, G, and B, and for each of the desired IR wavelength ranges of interest. Although an arm is shown, images of other areas of the body may also be captured.

Electronic devices 130, that can share images or video images 132 are communicatively coupled to one or more network computing environments 170 via a public network 150 such as the Internet. The electronic devices 102 can include, for example, information processing systems such as desktop computers, laptop computers, servers, wireless devices (e.g., mobile phones, tablets, personal digital assistants, etc.), and the like.

The electronic devices 130 access the network computing environment 170 via one or more interfaces (not shown) such as a web browser, application, etc. to utilize resources provided by the servers 170. Computing resources 170 include but are not limited to, processing, storage, networking, and other fundamental computing resources. Access to databases 178 used to store knowledge base data and other data. The server includes a training phase module 172. The training phase module 172 includes a color correlogram function, a wavelet texture function, color histogram function, a color wavelet function, an edge histogram function, GIST descriptor function, a multi scale local binary pattern function, or a combination thereof.

In another example, the databases 178, patient records are stored, manipulated, and retrieved in response to a query. Such records, in various embodiments, take the form of patient medical history stored in association with information identifying the patient along with information regarding the peripheral body part, identified regions of interest, camera settings, wavelengths of interest, temperature values associated with various stratifications of skin surface regions, mathematical representations and data values used to process the thermal image and temperature progressions for a medical diagnosis, and the like. Although the database is shown as an internal device, the database may be external to the server 170, for example, in a network-attached storage.

The server also includes a segmentation phase module 174, and an inference engine for overlaying.

The database 178 may include dermoscopic features include of central dots, scattered dots, peripheral globules, eccentric globules, diffuse blue/grey dots, central globules, uniform globules, cobblestone pattern, or a combination thereof In one example, a user (via an electronic device 130) utilizes the network computing environment 170 to deploy a multi-tier web application. In this example, a multi-tier web application is an application (software designed to enable a user to perform a given task) accessible over a network whose presentation, logic (application processing), and data storage processes are performed at physically separate tiers. For example, the presentation processes can be performed on a web server tier; the application processing can be performed on an application server tier; and the data storage processes can be performed on a database server tier.

Training Process

The presently claimed invention includes of two processes or phases: a training phase and a segmentation phase. First, all training images are broken down into several patches. In this example, the number of patches are defined by $\lambda$s. Next, the label of each patch is determined. The majority pixel label of the patch. Then, the training set is divided into two positive and negative sets. Next, low-level features of the training set are extracted (e.g. color correlogram, wavelet texture, color histogram, color wavelet, edge histogram, GIST, multi scale local binary pattern). Finally, a classifier is trained. This process is repeated for different $\lambda$s. In the experiments a variety of larger and smaller $\lambda$ are used This is shown in algorithm 1.

Figure 2:
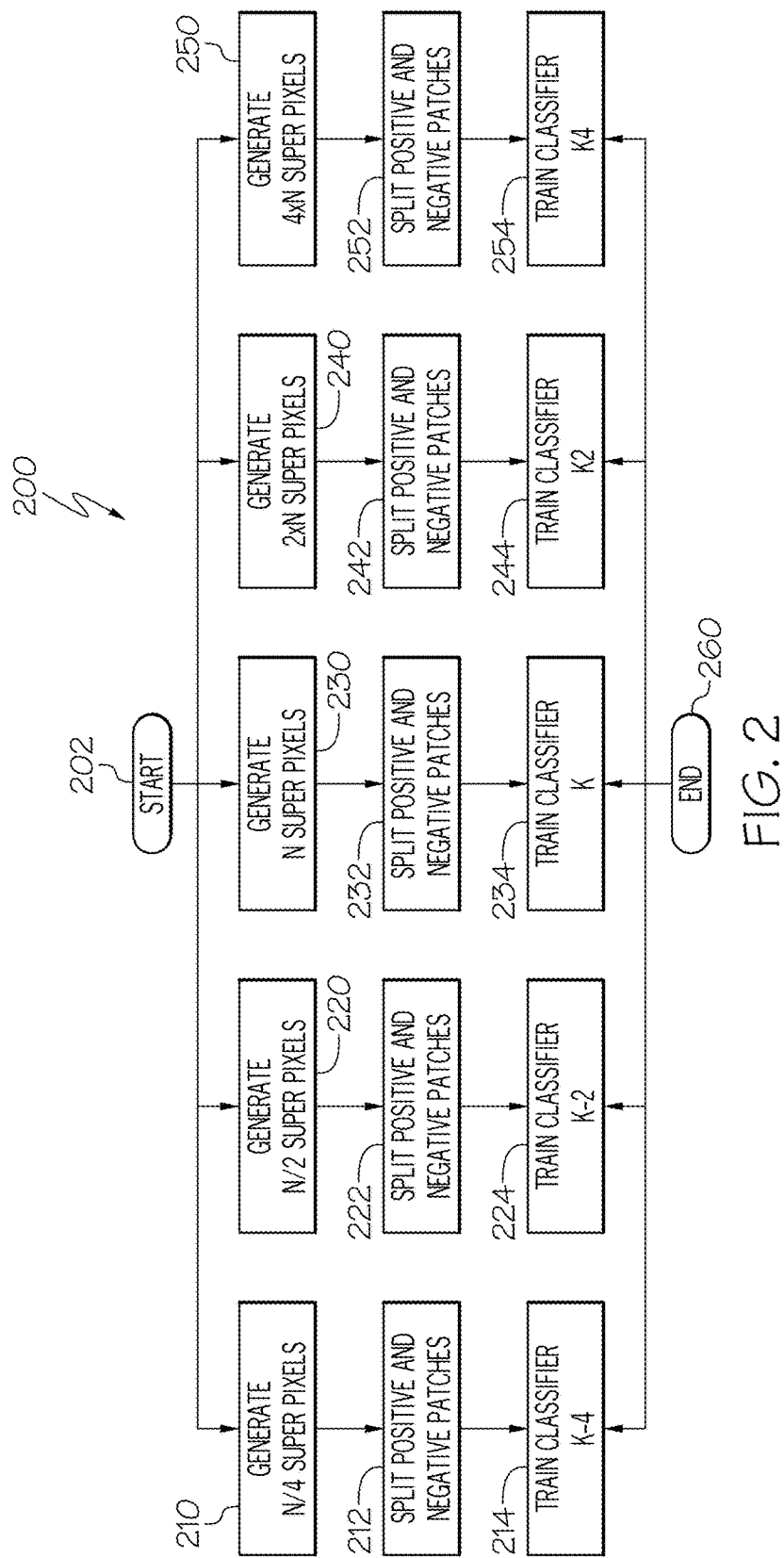
FIG. 2 is a workflow diagram illustrating a training phase for segmenting an image using the system of FIG. 1.

Algorithm 1: Train a helper classifier for segmentation
Data: $\Delta$: Training image set with border coordinates
Result: a classifier to identify mole patch initialization
for $\lambda$ in range $|a,b|$ do
$\quad \Phi \leftarrow$ GeneratePatches($\lambda,\Delta$);
$\quad \phi^+, \phi^- \leftarrow$ LabelPatches ($\phi$);
$\quad \delta^+ \leftarrow$ ExtractLowLevelFeatures($\phi^+$);
$\quad \delta^- \leftarrow$ ExtractLowLevelFeatures($\phi^-$);
$\quad cl \leftarrow$ TrainClassifier($\delta^+, \delta^-$)
end FIG. 2 is a workflow diagram 200 illustrating a training phase for segmenting an image using the system of FIG. 1. Shown are five different training sub-sections paths for N/4, N/2, N, 2*N, 4*N. N is a discrete positive integer, correspond to patch sizes λ 0.4x, 0.8x, 1x, 2x, 4x. Examples of different patch sizes are shown in FIG. 4A-4E. An initial of λ is 100, means each image is broke down to 100 patches. The λ scaled up by multiplying factors of 2, 4 and scaled down by multiply factors of 0.4, and 0.8.

More specifically, the flow starts at step 202, and for patch size N/4 the sub-sections are generated in step 210. Next in step 212, each subsection is labeled into a first category, such as positive ($\phi^+$), and a second category, such as negative ($\phi^-$). Low level features for the first category ($\phi^+$) are extracted into a first classifier ($\delta^+$). Likewise, the low level features for the second category ($\phi^-$) are extracted into a second classifier ($\delta^-$). In step 214, a binary classifier (cl←TrainClassifier($\delta$+, $\delta^-$) is trained on whether it is one of a boundary type or non-boundary type, i.e. mole or lesion versus skin. The process ends in step 260.

The other branches of this process i.e. 220, 222, 224 for N/2, 230, 232, 234 for N, 240, 242, 244 for N*2, and 250, 252, 254 for N*4 are identical to the flow above for 210, 212, 214 for N/4. Only the number of patches (λ) or patch size is different. These processes although shown in parallel can be run sequentially as well.

Segmentation Phase

First, a given image is decomposed to λ patches. Then the trained classifier associated with λ are applied on the extracted patches. By putting back the predicted label of each patch, a prediction label-map is constructed. By repeating the same process for various λs, several prediction label-maps are generated. In order to merge the generated prediction label-maps, in one example an average in pixel level is calculated. This results in a probability map. Stated differently, the classifiers are outputted and a probability map generated. Then probability map is overlayed, using a weighted average, on other probability maps generated from other classifiers containing the image sub-section.

Then the probability map is thresholded to generate a binary mole border map. This is shown in algorithm 2:

Algorithm 2: Generate border by using classification method and producing probability maps.

Figure 3:
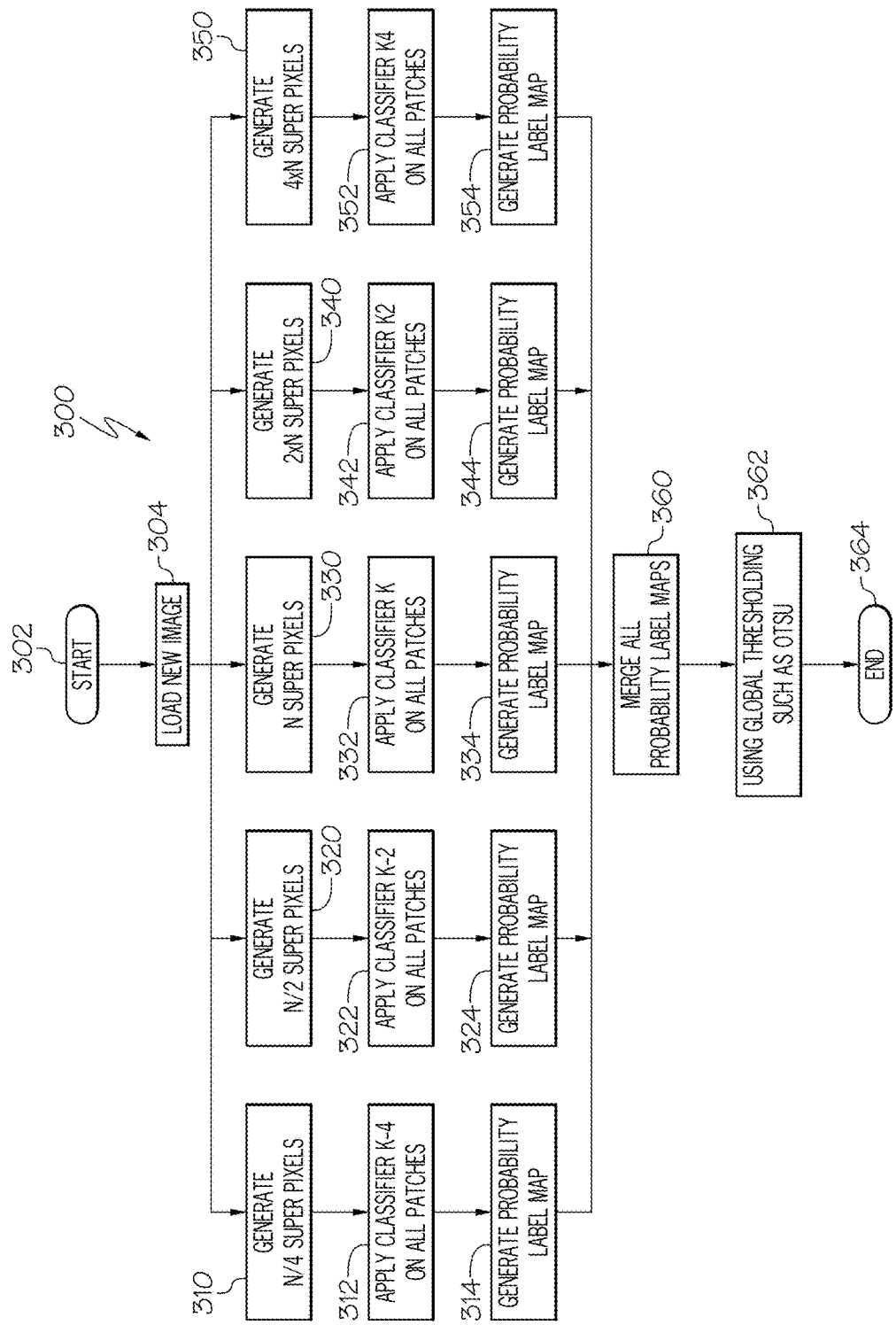
FIG. 3 is a workflow diagram illustrating a segmentation phase for an image using the system of FIG. 1.
Figure 5B:
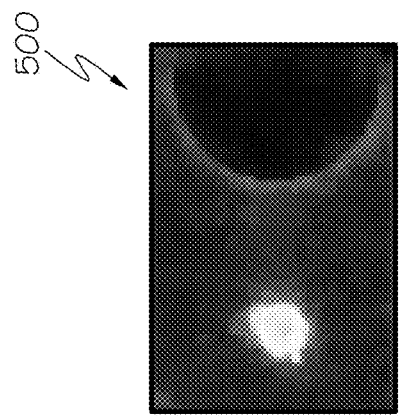
FIG. 5A-5D are a series of images illustrating a comparison between a dermoscopy image, a probability map image, a generated border image, and a ground truth border image.
Figure 5D:
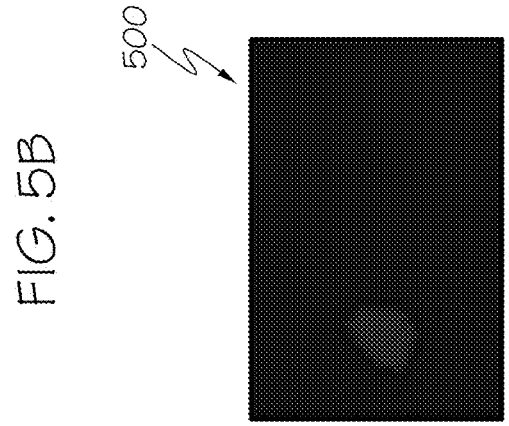
Figure 5A:
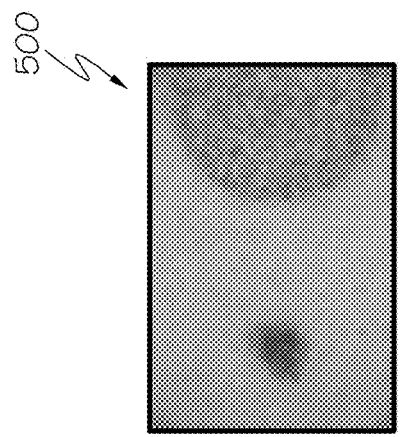
Figure 5C:
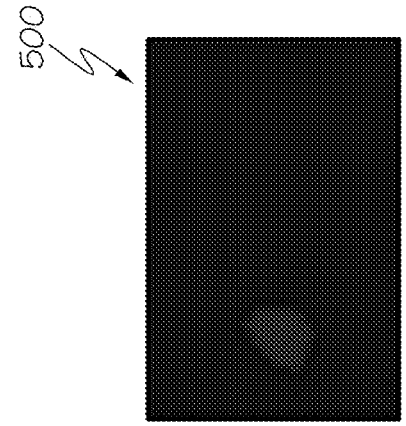
Figure 6B:
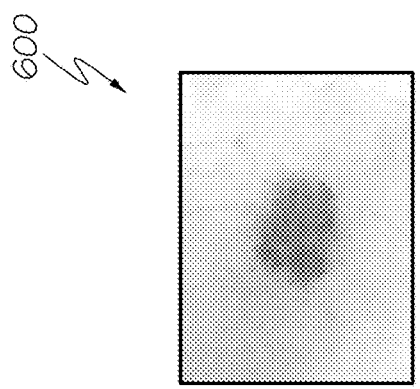
FIG. 6A-6D are a series of images illustrating a comparison between a dermoscopic features of central dots, scattered dots, central globules, and cobblestone pattern.
Figure 6D:
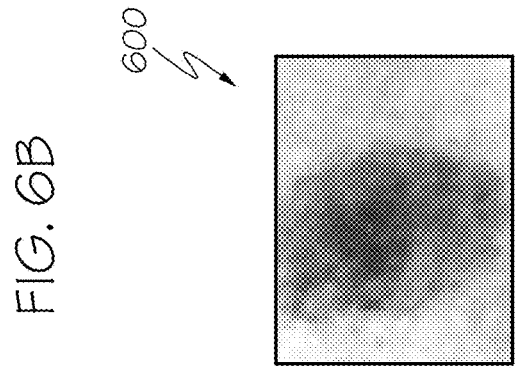
Figure 6A:
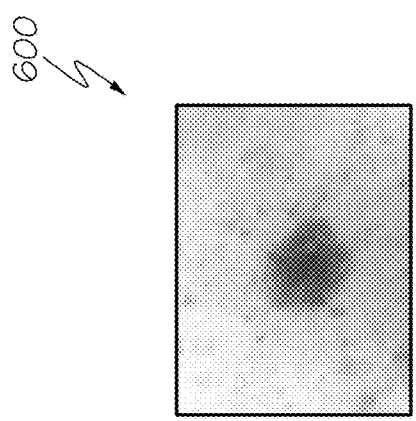
Figure 6C:
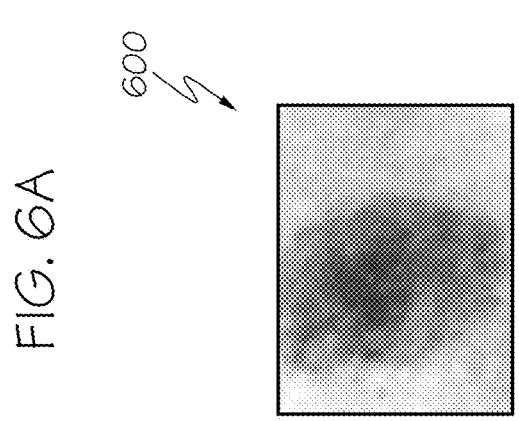

Data: Δ: a test image
Result: border segmentation initialization
for λ in range |a,b| do
  Φ←GeneratePatchesλ,Δ;
  $\rho_\lambda$←ApplyClassifier(Φ, λ);
end
Ψ←Overlay($\rho_\lambda$);
border←Threshould(Ψ);

FIG. 3 is a workflow diagram 300 illustrating a segmenting phase using the system of FIG. 1. The process starts in step 302 and immediately proceeds to step 304 in which a new image is loaded. As described above for FIG. 2, there are five different sub-sections paths for N/4, N/2, N, 2*N, 4*N, N is a positive integer, correspond to patch sizes λ 0.4x, 0.8x, 1x, 2x, 4x. Selecting the path for N/4, the process continues to step 310 in which and for patch size N/4 the sub-sections are generated. Next in step 312, a trained classifier is applied to each image sub-section for the discrete number of image sub-sections, the trained classifier representing a probability that the image sub-section is the boundary type ($\rho_\lambda$←ApplyClassifier(Φ, λ)). In step 314, probability label map is generated. All the probability label maps are merged in step 360. Or stated differently, the classifiers are outputted and a probability map generated. Then probability map is overlayed on other probability maps generated from other classifiers containing the image sub-section.outputting of classifiers and generating a probability map then overlaying the probability map on other probability maps generated from other classifiers containing the image sub-section.

In response to the overlaid trained classifier being above a settable threshold, identifying the image sub-section as a border segment in step 362. The process ends in step 364.

The other branches of this process i.e. 320, 322, 324 for N/2, 330, 332, 334 for N, 340, 342, 344 for N*2, and 350, 352, 354 for N*4 are identical to the flow above for 310, 312, 314 for N/4. Only the number of patches (λ) or patch size is different. These processes although shown in parallel can be run sequentially as well.

EXPERIMENTAL RESULTS

Simulation experiments were run to compare the presently disclosed border detection technique with thresholding methods, using two different publicly available dermoscopy data sets: ISIC and $Ph^2$. The experimental results suggest that the presently disclosed method outperformed the other border detection methods.

For each data set, the proposed method for sub-sections are λ=(0.4x, 0.2x, 1x, 2x, 4x) where (1x=100 patches). The generated borders of each level as well as the final merged border have been compared with ground truth in terms of Average Precision (AP), Area under the ROC curve (AUC), Accuracy (ACC), Percision (PRC), Recall (RCL), Sensitivity (SEN), Specificity (SPC), Jaccard index (JC), and Dice coefficient (DC). See Table 1 and Table 2.

A comparative analysis were run between our proposed method and six different border detection methods (four threshold based and two region growing based) on $PH^2$. See Table 3.

FIG. 5: By merging all prediction label maps in pixel level, a probability map is generated. By applying thresholding (0.6) a binary mask is constructed which represents the mole borders. Shown in FIG. 5A-5E are a series image illustrating a comparison between a dermoscopy image, a probability map image, a generated border image, and a ground truth border image;

TABLE 1

Table 1: The accuracy of each classification level of on ISIC data set. The highest scores of each metric are marked in boldface.

| λ | AP | AUC | ACC | PRC | RCL | SEN | SPC | JC | DC |
|---|----|-----|-----|-----|-----|-----|-----|----|----|
| 0.4x | 0.73 | 0.94 | 0.97 | 0.64 | 0.70 | 0.70 | 0.98 | 0.49 | 0.61 |
| 0.8x | 0.75 | 0.95 | 0.97 | 0.58 | 0.75 | 0.75 | 0.97 | 0.46 | 0.59 |
| 1x | 0.76 | 0.96 | 0.96 | 0.47 | 0.80 | 0.80 | 0.96 | 0.40 | 0.53 |
| 2x | 0.73 | 0.96 | 0.94 | 0.36 | 0.85 | 0.85 | 0.94 | 0.32 | 0.45 |
| 4x | 0.70 | 0.96 | 0.88 | 0.30 | 0.85 | 0.85 | 0.88 | 0.26 | 0.37 |
| Merge | 0.81 | 0.90 | 0.97 | 0.75 | 0.82 | 0.82 | 0.98 | 0.62 | 0.73 |

TABLE 2

Table 2: Results on Ph2 data set. The highest scores of each metric are marked in boldface.

| λ | AP | AUC | ACC | PRC | RCL | SEN | SPC | JC | DC |
|---|----|-----|-----|-----|-----|-----|-----|----|----|
| 0.4x | 0.94 | 0.97 | 0.92 | 0.85 | 0.90 | 0.90 | 0.91 | 0.77 | 0.86 |
| 0.8x | 0.95 | 0.97 | 0.92 | 0.84 | 0.90 | 0.90 | 0.91 | 0.77 | 0.86 |
| 1x | 0.95 | 0.97 | 0.91 | 0.83 | 0.90 | 0.90 | 0.90 | 0.75 | 0.84 |
| 2x | 0.95 | 0.97 | 0.91 | 0.84 | 0.89 | 0.89 | 0.91 | 0.75 | 0.84 |

TABLE 2-continued

Table 2: Results on Ph2 data set. The highest scores of each metric are marked in boldface.

| λ | AP | AUC | ACC | PRC | RCL | SEN | SPC | JC | DC |
|---|----|-----|-----|-----|-----|-----|-----|----|----|
| 4x | 0.94 | 0.96 | 0.89 | 0.80 | 0.89 | 0.89 | 0.88 | 0.71 | 0.82 |
| Merge | 0.93 | 0.94 | 0.94 | 0.91 | 0.92 | 0.92 | 0.96 | 0.84 | 0.91 |

TABLE 3

Table 3: The comparison results of our proposed method and other border detection methods.

| Method | AP | AUC | ACC | PRC | RCL | SEN | SPC | JC | DC |
|---|----|-----|-----|-----|-----|-----|-----|----|----|
| Otsu | 0.89 | 0.85 | 0.89 | 0.93 | 0.79 | 0.79 | 0.90 | 0.74 | 0.84 |
| Adaptive Thresholding | 0.87 | 0.84 | 0.86 | 0.79 | 0.79 | 0.88 | 0.70 | 0.80 | 0.69 |
| ISO Data Thresholding | 0.89 | 0.84 | 0.89 | 0.93 | 0.79 | 0.79 | 0.90 | 0.73 | 0.83 |
| Yen Thresholding | 0.87 | 0.81 | 0.84 | 0.84 | 0.82 | 0.82 | 0.81 | 0.70 | 0.79 |
| Water Shedding | 0.66 | 0.50 | 0.64 | 0.05 | 0.04 | 0.04 | 0.96 | 0.05 | 0.09 |
| Random Walker | 0.66 | 0.50 | 0.35 | 0.31 | 0.95 | 0.95 | 0.04 | 0.31 | 0.43 |
| Classification based border detection | 0.93 | 0.94 | 0.94 | 0.91 | 0.92 | 0.92 | 0.96 | 0.84 | 0.91 |

The proposed method demonstrates that the disclosed segmentation method outperform common border detection methods.

Learning High-Level Features (Clinical Features)

The segmentation algorithm leverage both high-level features and low-level features. In this example the training of the classifier includes high-level features from pixels (using convolution neural networks) or extracted low-level features such as color correlogram, wavelet texture, color histogram, etc. For example, in dermoscopy images low-level features can be used to train classifier to identify circles and dots, which then can be used to identify dermoscopic features such as globules (central dots, scattered dots, peripheral globules, eccentric globules, diffuse blue/grey dots, central globules, uniform globules, cobblestone pattern, and more).

FIG. 6A-6D are a series image illustrating a comparison between a dermoscopic features of central dots, scattered dots, central globules, and cobblestone pattern. From left to right, Central dots, Scattered dots, Central globules, Cobblestone pattern respectively:

In dermoscopy imaging, there are many dermoscopic features which can contribute to better understanding of the property of the mole such as: colors, pigment network, amorphous structureless areas (blotches), -leaf-like areas, blue ovoid masses, milia-like cysts, Fissures and comedo-like openings, blood vessels.

Smart-Adaptive Merging

The purpose of this component is to make a robust decision by getting all generated/gathered information such as low-level features, high-level features, outputs of probability classifiers. The inference process is an iterative/recursive process which is adaptive and trainable to consider high-level and low-level features as well as the patch size, classification confidence scores and neighboring patches information. The inference process consider following decision rules:

1—Patterns (high-level features) highly correlated to skins are different in principal with pattern correlated to skin patches. For example, if a patch is detected as globules, it is highly likely that the patch belongs to mole.

2—The high-level features are reliable to certain degree, it is highly correlated to the size of patches. In other words for big size patches the high-level patches are more contributing to final decision, while for small size patches (towards pixel level resolutions) the low-level features are used more.

3—The association between neighboring patches is to be learned (spatial aware properties). For example, generally a patch of skin in the middle of group of mole patches is typically not expected, however skin similar patches (with low-mid confidence to be skin) in the middle of a mole is expected which is annotated as "Cobblestone patterns". For example in the right most pictures on top in FIG. 6, this association/expectation is different for other high-level features. In other words a conditional probability model of belonging a patch to be X is trained considering the neighboring patches (Ys) considering the detected low and high level features associated with those patches (X and Ys)

4—Generally the mole patches are expected to be connected, thus conditional probability formula can smooth out the connection of neighboring mole patches. Graph based probability model in one example can be used to smooth out the inference process.

5—The confidence score of the inference process is a probability based combination of classification scores, size of patches, type of high-level feature associated to the area of the interest and neighboring area.

6—If the inference engine has not come to a concrete decision (with low confidence or no confidence at all) for some patches, those patches (parents) are broken down into smaller patches (childs) and then sent to appropriate classifiers. The decision of the big patches (parent) which comes from the previous step and the new results of classification scores are given to step 1 to 5 to be considered in the inference process. This process continues until a certain level of patch sizes (potentially as small as pixels).

7—By overlaying all inference confidence scores (which represents probability of belonging the patch to a class), the probability map is generated.

Figure 7A:
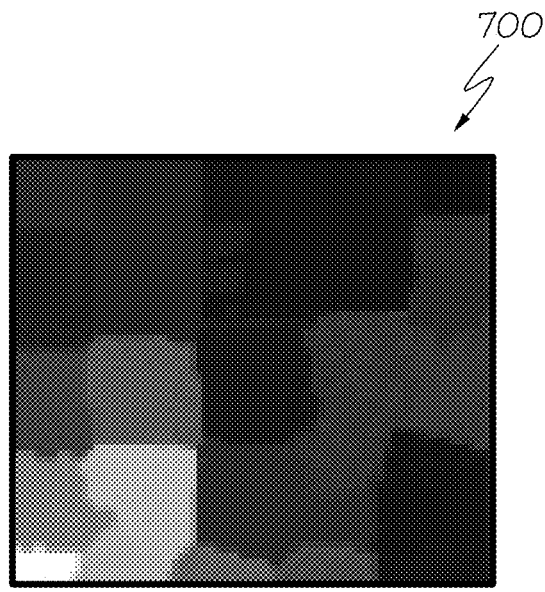
FIG. 7A-7B are a series of images illustrating smoothing out features between patches.
Figure 7B:
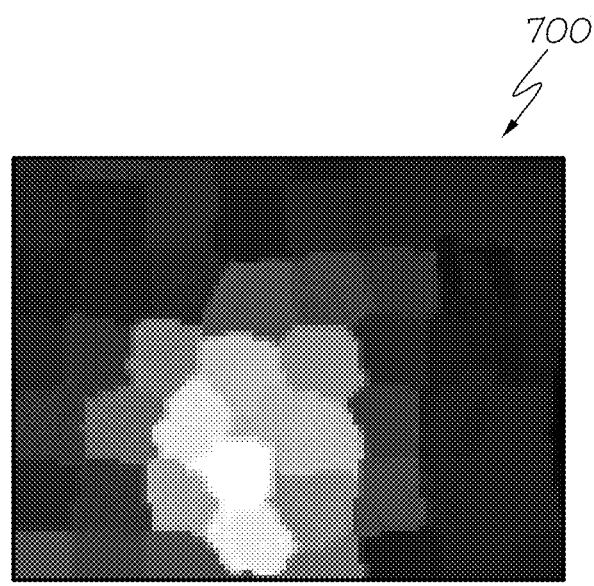

FIG. 7A-7B are a series of images illustrating smoothing out features between patches. In FIG. 7A, a circle is shown around a dark region which does not appear to be a mole, but by zooming and going into more detail, the mole area can be distinguished further as shown in FIG. 7B.

Generalized Network Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

A cloud computing environment is service oriented with a focus on statelessness, low coupling, modularity, and semantic interoperability. At the heart of cloud computing is an infrastructure comprising a network of interconnected nodes.

Figure 8:
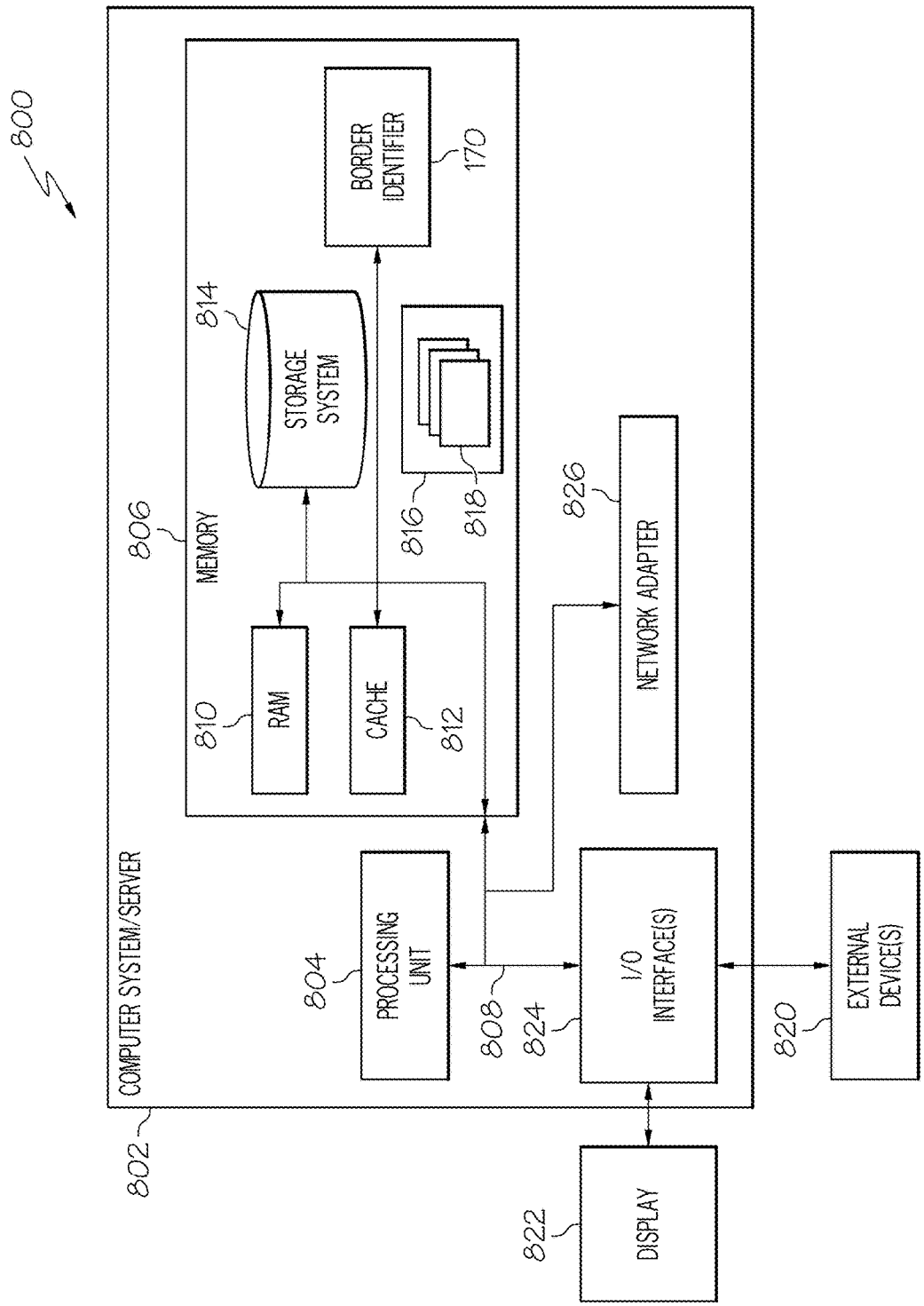
FIG. 8 illustrates one example of a server computing node according to one embodiment of the present invention of FIG. 1.

Referring now to FIG. 8, a schematic of an example of a computing node is shown. Cloud computing node 800 is only one example of a suitable cloud computing node and is not intended to suggest any limitation as to the scope of use or functionality of embodiments of the invention described herein. Regardless, cloud computing node 800 is capable of being implemented and/or performing any of the functionality set forth hereinabove.

In cloud computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 816, 818, a system memory 806, and a bus 808 that couples various system components including system memory 806 to processor 804.

Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 818, having a set (at least one) of program modules, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of embodiments of the invention as described herein. Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Non-Limiting Examples

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-based method for segmenting an image to identify a border using supervised machine learning, the method comprising:
   a training phase including
   a) accessing a training image set with at least one training image, wherein each training image includes border coordinates;
   b) generating a discrete number of training sub-sections of the training image within a given set of numbers;
   c) labeling each of the training sub-sections into one of a first category and a second category;
   d) extracting low level features for the first category into a first classifier;
   e) extracting low level features for the second category into a second classifier;
   f) training a binary classifier on whether it is one of a boundary type or non-boundary type;
   repeating a through f until each discrete number of sub-sections in the given set of numbers has been generated for each image in the training image set;
   a segmentation phase including
   g) accessing an image set with at least one image;
   h) selecting a discrete number of image sub-sections of the image within the given set of numbers;
   i) applying a trained classifier to each image sub-section for the discrete number of image sub-sections, the classifier representing a probability that the image sub-section is the boundary type;
   j) outputting of classifiers and generating a probability map then overlaying the probability map on other probability maps generated from other classifiers containing the image sub-section;

k) in response to the overlaid trained classifier being above a settable threshold, identifying the image sub-section as a border segment; and repeating g through k until each discrete number of sub-sections in the given set of numbers has been generated for each image in the image set.

2. The computer-based method of claim 1, wherein the boundary type is a lesion and the non-boundary type is skin.

3. The computer-based method of claim 1, wherein the extracting low level features for the first category into a first classifier includes using one of a color correlogram function, a wavelet texture function, color histogram function, a color wavelet function, an edge histogram function, GIST descriptor function, a multi scale local binary pattern function, or a combination thereof.

4. The computer-based method of claim 3, wherein the extracting low level features for the second category into a second classifier includes using one of a color correlogram function, a wavelet texture function, color histogram function, a color wavelet function, an edge histogram function, GIST descriptor function, a multi scale local binary pattern function, or a combination thereof.

5. The computer-based method of claim 1, wherein the generating a discrete number of training sub-sections of an image in the training image set includes generating each of the sub-sections as a superpixel.

6. The computer-based method of claim 1, wherein the applying a trained classifier to each image sub-section for the discrete number of image sub-sections, includes applying an average weight to each classifier.

7. The computer-based method of claim 1, wherein the applying a trained classifier to each image sub-section for the discrete number of image sub-sections, includes applying a weight to each classifier using an inference engine and a size of the sub-sections, confidence of classifier, and information regarding neighboring sub-sections.

8. The computer-based method of claim 1, wherein the applying a trained classifier to each image sub-section for the discrete number of image sub-sections, includes applying a weight to each classifier using an inference engine and dermoscopic features of central dots, scattered dots, peripheral globules, eccentric globules, diffuse blue/grey dots, central globules, uniform globules, cobblestone pattern, or a combination thereof.

9. The computer-based method of claim 8, wherein the dermoscopic features include of central dots, scattered dots, peripheral globules, eccentric globules, diffuse blue/grey dots, central globules, uniform globules, cobblestone pattern, or a combination thereof.

10. A system for segmenting an image to identify a border using supervised machine learning, the system comprising:
a memory;
a processor communicatively coupled to the memory, where the processor is configured to perform
a training phase including
a) accessing a training image set with at least one training image, wherein each training image includes border coordinates;
b) generating a discrete number of training sub-sections of the training image within a given set of numbers;
c) labeling each of the training sub-sections into one of a first category and a second category;
d) extracting low level features for the first category into a first classifier;
e) extracting low level features for the second category into a second classifier;
f) training a binary classifier on whether it is one of a boundary type or non-boundary type;
repeating a through f until each discrete number of sub-sections in the given set of numbers has been generated for each image in the training image set;
a segmentation phase including
g) accessing an image set with at least one image;
h) selecting a discrete number of image sub-sections of the image within the given set of numbers;
i) applying a trained classifier to each image sub-section for the discrete number of image sub-sections, the classifier representing a probability that the image sub-section is the boundary type;
j) outputting of classifiers and generating a probability map then overlaying the probability map on other probability maps generated from other classifiers containing the image sub-section;
k) in response to the overlaid trained classifier being above a settable threshold, identifying the image sub-section as a border segment; and
repeating g through k until each discrete number of sub-sections in the given set of numbers has been generated for each image in the image set.

11. The system of claim 10, wherein the boundary type is a lesion and the non-boundary type is skin.

12. The system of claim 10, wherein the extracting low level features for the first category into a first classifier includes using one of a color correlogram function, a wavelet texture function, color histogram function, a color wavelet function, an edge histogram function, GIST descriptor function, a multi scale local binary pattern function, or a combination thereof.

13. The system of claim 12, wherein the extracting low level features for the second category into a second classifier includes using one of a color correlogram function, a wavelet texture function, color histogram function, a color wavelet function, an edge histogram function, GIST descriptor function, a multi scale local binary pattern function, or a combination thereof.

14. The system of claim 10, wherein the generating a discrete number of training sub-sections of an image in the training image set includes generating each of the sub-sections as a superpixel.

15. The system of claim 10, wherein the applying a trained classifier to each image sub-section for the discrete number of image sub-sections, includes applying an average weight to each classifier.

16. The system of claim 10, wherein the applying a trained classifier to each image sub-section for the discrete number of image sub-sections, includes applying a weight to each classifier using an inference engine and a size of the sub-sections, confidence of classifier, and information regarding neighboring sub-sections.

17. The system of claim 10, wherein the applying a trained classifier to each image sub-section for the discrete number of image sub-sections, includes applying a weight to each classifier using an inference engine and dermoscopic features of central dots, scattered dots, peripheral globules, eccentric globules, diffuse blue/grey dots, central globules, uniform globules, cobblestone pattern, or a combination thereof.

18. The system of claim 17, wherein the dermoscopic features include of central dots, scattered dots, peripheral globules, eccentric globules, diffuse blue/grey dots, central globules, uniform globules, cobblestone pattern, or a combination thereof.

19. A non-transitory computer program product for segmenting an image to identify a border using supervised machine learning comprising a computer readable storage medium having computer readable program code embodied therewith, the computer readable program code configured to perform:

a training phase including
- a) accessing a training image set with at least one training image, wherein each training image includes border coordinates;
- b) generating a discrete number of training sub-sections of the training image within a given set of numbers;
- c) labeling each of the training sub-sections into one of a first category and a second category;
- d) extracting low level features for the first category into a first classifier;
- e) extracting low level features for the second category into a second classifier;
- f) training a binary classifier on whether it is one of a boundary type or non-boundary type;

repeating a through f until each discrete number of sub-sections in the given set of numbers has been generated for each image in the training image set;

a segmentation phase including
- g) accessing an image set with at least one image;
- h) selecting a discrete number of image sub-sections of the image within the given set of numbers;
- i) applying a trained classifier to each image sub-section for the discrete number of image sub-sections, the classifier representing a probability that the image sub-section is the boundary type;
- j) outputting of classifiers and generating a probability map then overlaying the probability map on other probability maps generated from other classifiers containing the image sub-section;
- k) in response to the overlaid trained classifier being above a settable threshold, identifying the image sub-section as a border segment; and repeating g through k until each discrete number of sub-sections in the given set of numbers has been generated for each image in the image set.

20. The non-transitory computer program product of claim 19, wherein the boundary type is a lesion and the non-boundary type is skin.

\* \* \* \* \*